March 11, 1941. J. DICHTER 2,234,302
APPARATUS FOR FORMING INNER THREADS ON CONTAINERS
Filed Dec. 7, 1936 15 Sheets-Sheet 1

INVENTOR.
Jakob Dichter
BY Charles B. Belknap
ATTORNEY

March 11, 1941.   J. DICHTER   2,234,302
APPARATUS FOR FORMING INNER THREADS ON CONTAINERS
Filed Dec. 7, 1936   15 Sheets-Sheet 2

INVENTOR.
Jakob Dichter
BY Charles B. Belknap
ATTORNEY.

March 11, 1941.   J. DICHTER   2,234,302
APPARATUS FOR FORMING INNER THREADS ON CONTAINERS
Filed Dec. 7, 1936   15 Sheets-Sheet 4
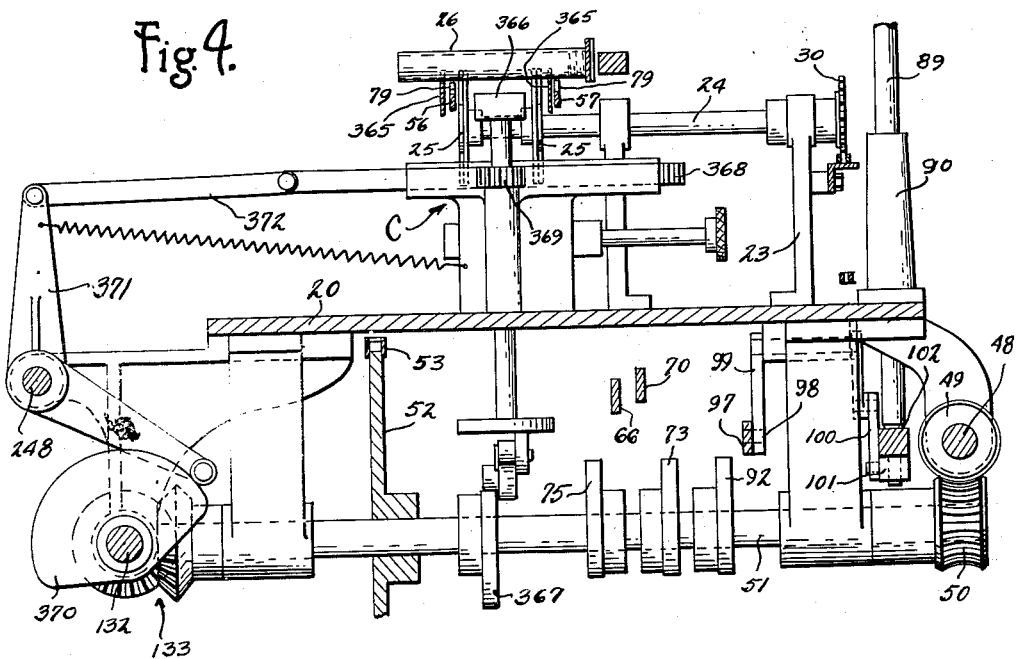
Fig. 4.
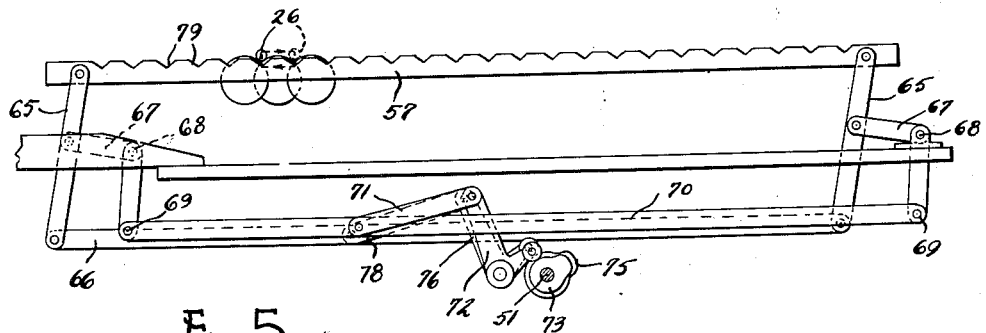
Fig. 5.
Fig. 21.
INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 5

INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 6

INVENTOR.
Jakob Dichter
BY
ATTORNEY.

March 11, 1941. J. DICHTER 2,234,302
APPARATUS FOR FORMING INNER THREADS ON CONTAINERS
Filed Dec. 7, 1936 15 Sheets-Sheet 7

INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 8

INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 10
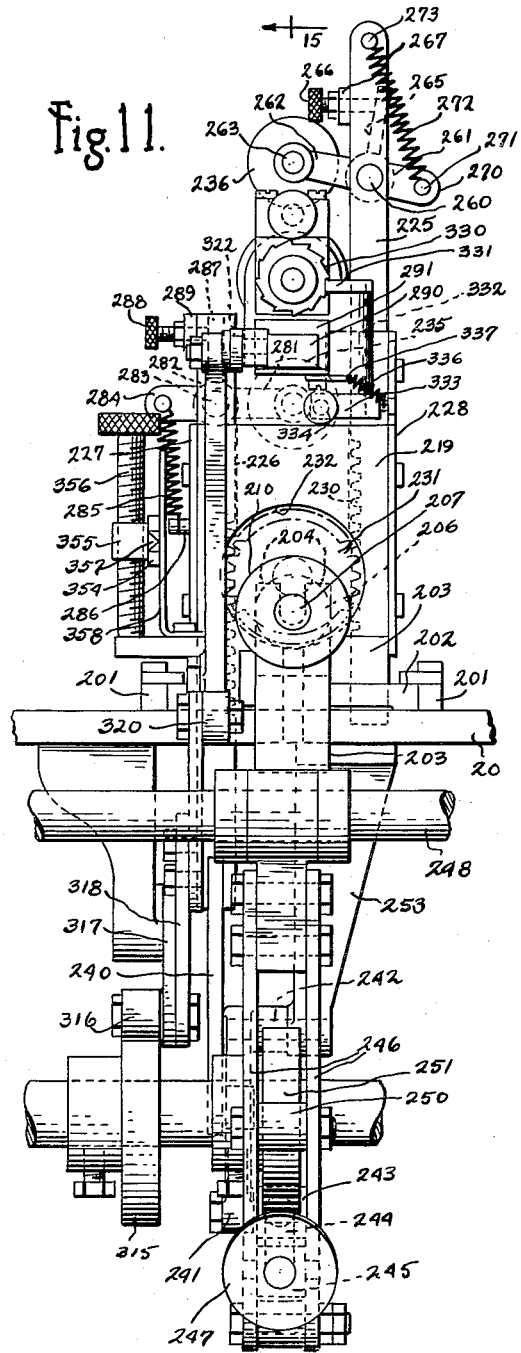
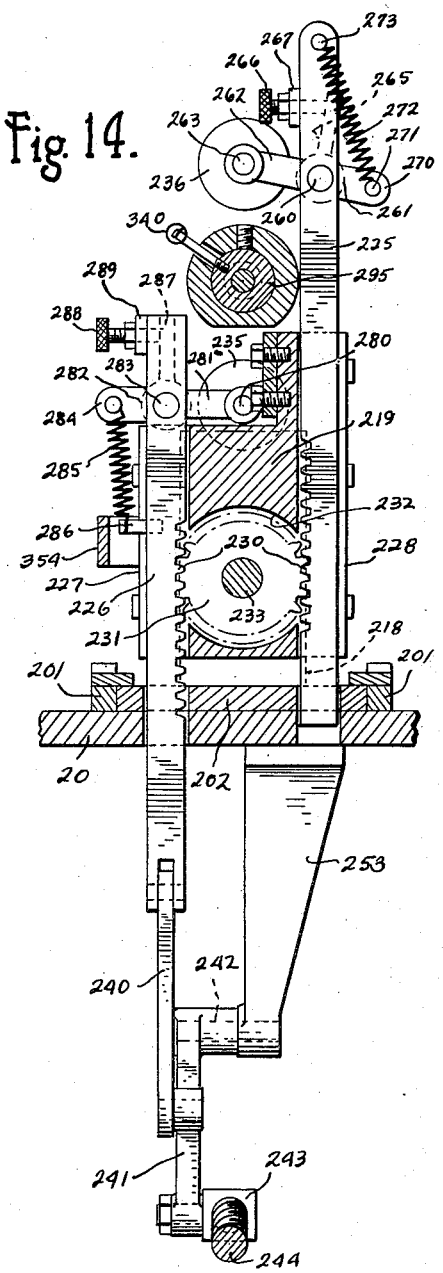
INVENTOR.
Jakob Dichter
BY Charles B. Belknap
ATTORNEY.

March 11, 1941.  J. DICHTER  2,234,302
APPARATUS FOR FORMING INNER THREADS ON CONTAINERS
Filed Dec. 7, 1936  15 Sheets-Sheet 11
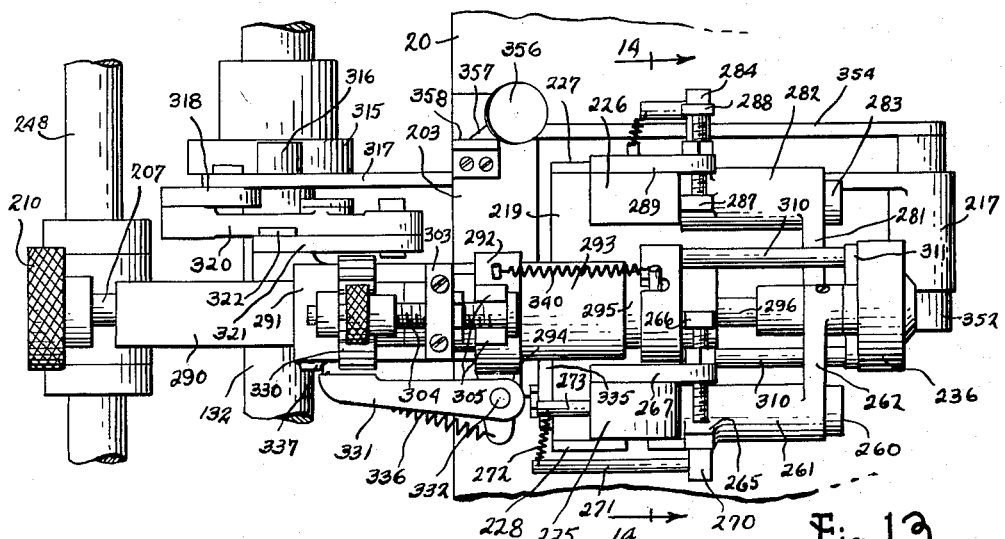
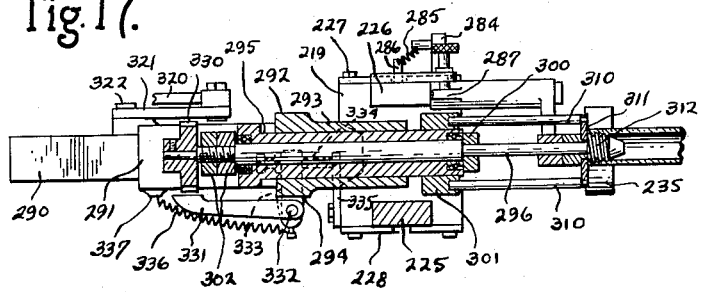
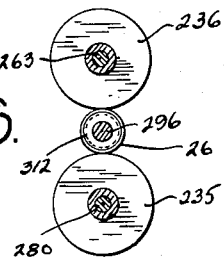
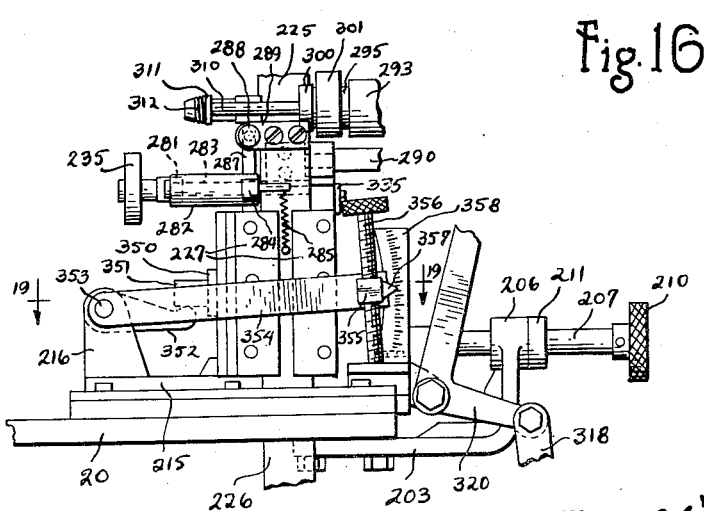
INVENTOR.
Jakob Dichter
BY Charles B. Belknap
ATTORNEY.

March 11, 1941.  J. DICHTER  2,234,302
APPARATUS FOR FORMING INNER THREADS ON CONTAINERS
Filed Dec. 7, 1936   15 Sheets-Sheet 12

INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 13
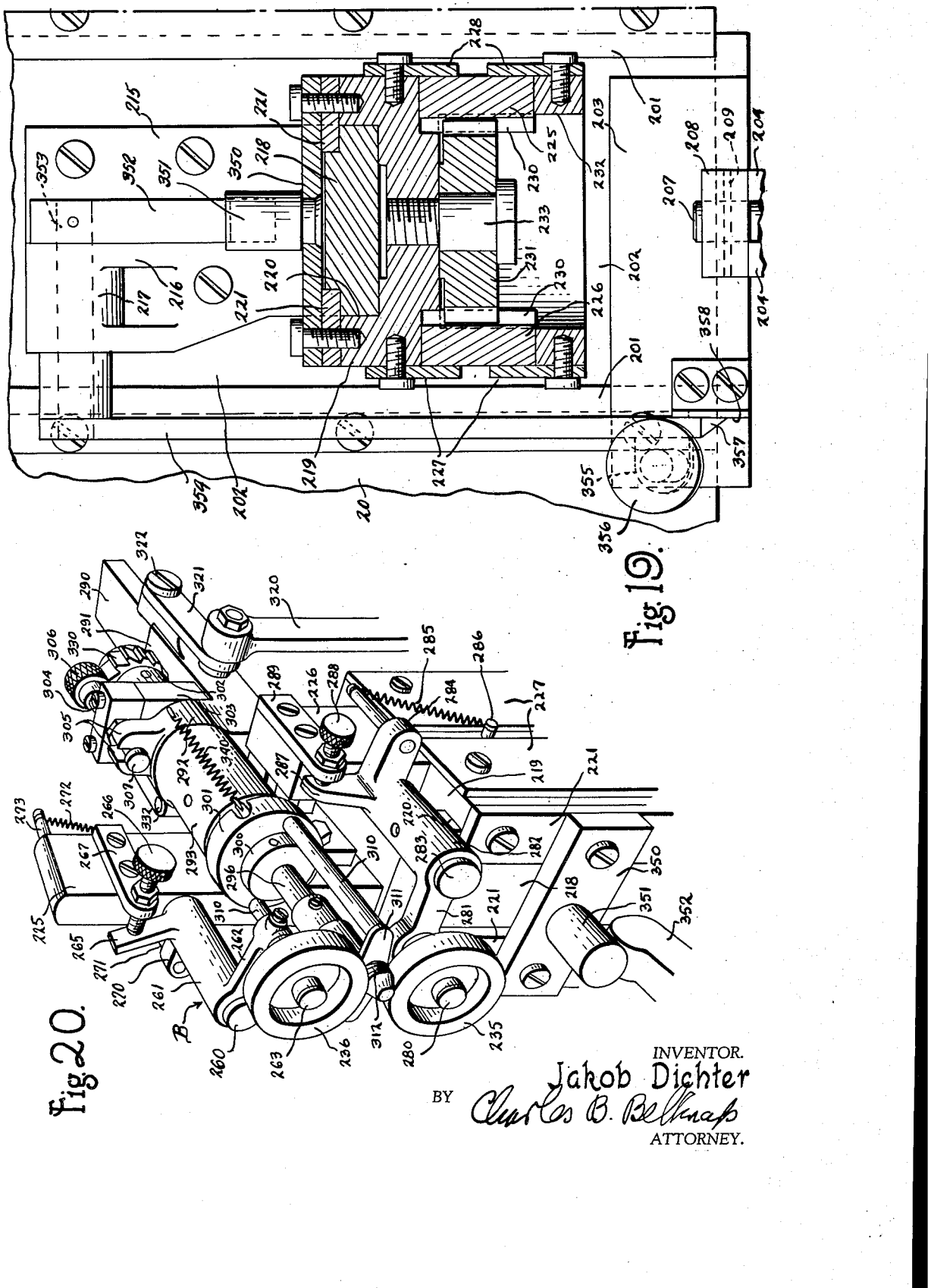
INVENTOR.
Jakob Dichter
BY Charles B. Belknap
ATTORNEY.

March 11, 1941. J. DICHTER 2,234,302
APPARATUS FOR FORMING INNER THREADS ON CONTAINERS
Filed Dec. 7, 1936 15 Sheets-Sheet 14
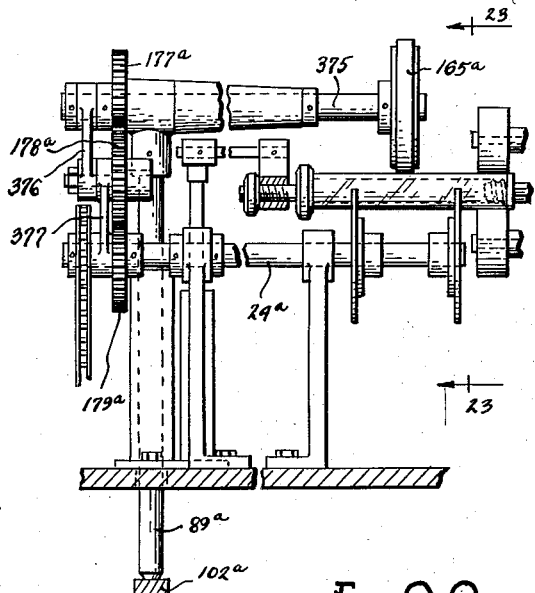
Fig. 22.
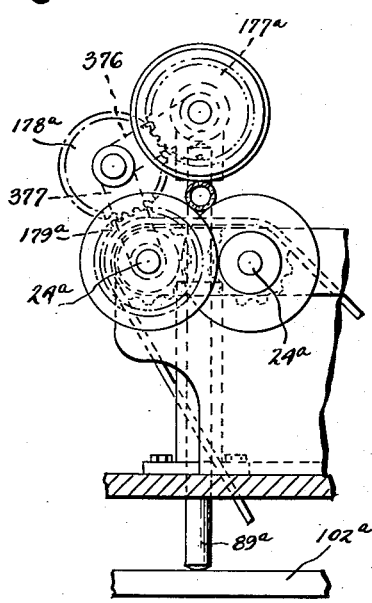
Fig. 23.
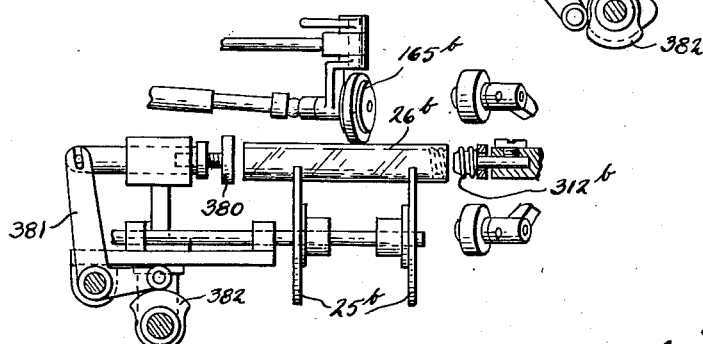
Fig. 25.
Fig. 24.
INVENTOR.
Jakob Dichter
BY Charles B. Belknap
ATTORNEY.

March 11, 1941.  J. DICHTER  2,234,302
APPARATUS FOR FORMING INNER THREADS ON CONTAINERS
Filed Dec. 7, 1936  15 Sheets—Sheet 15
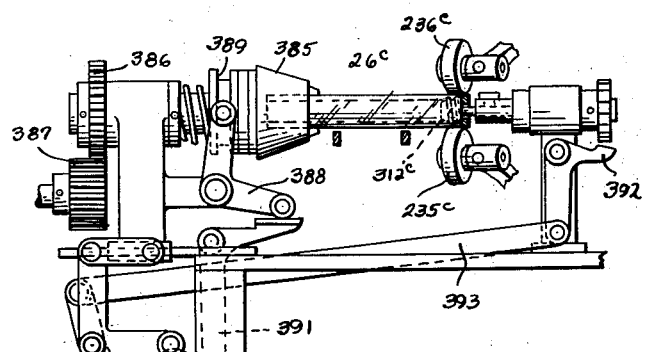
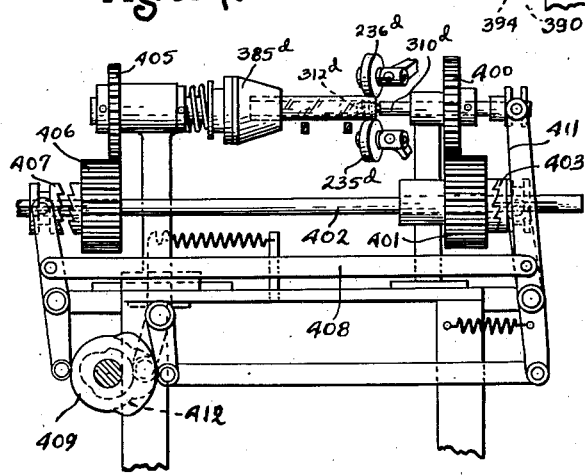
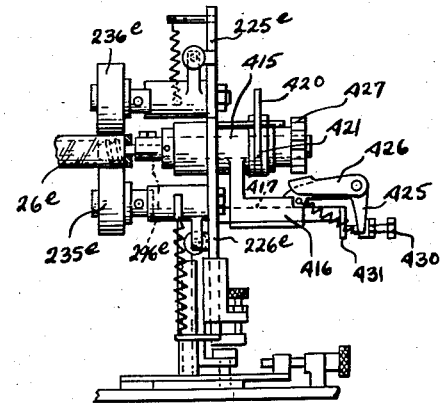
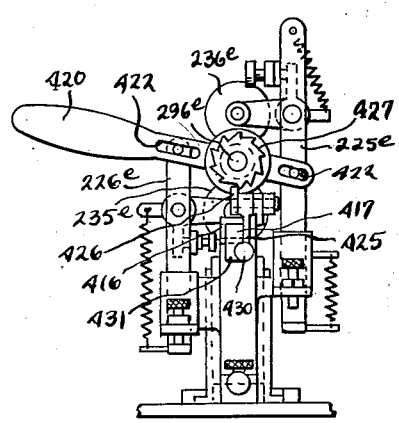
INVENTOR.
Jakob Dichter
BY Charles B. Belknap
ATTORNEY.

Patented Mar. 11, 1941

2,234,302

UNITED STATES PATENT OFFICE 2,234,302

APPARATUS FOR FORMING INNER THREADS ON CONTAINERS

Jakob Dichter, Berlin-Schoneberg, Germany

Application December 7, 1936, Serial No. 114,525
In Germany December 11, 1935

7 Claims. (Cl. 49—7)

This invention relates to apparatus for forming inner threads on containers such as vials or the like.

One of the primary objects of this invention is to provide an apparatus whereby the threaded necks of vials may be made of any desired diameter and more particularly, whereby the inner diameter of the neck may be made of the same diameter or larger than the diameter of the vial of which the neck forms a part.

A further object of this invention is to provide an apparatus which will be automatic in its operation whereby vials with inner threads may be economically produced on a commercial scale.

The invention further contemplates the provision of means for initially flaring the end of the vial to be threaded and thereafter forming on the interior of the vial the desired threads.

Numerous other objects and advantages of this invention will become more apparent as the following description proceeds particularly when reference is had to the accompanying drawings wherein;

Fig. 4 is a transverse sectional view taken substantially on the line 4—4 of Fig. 1;

Fig. 5 is a diagrammatic view of the transport bars forming a part of the machine;

Fig. 9 is a fragmentary sectional view on the line 9—9 of Fig. 7;

Fig. 11 is an end elevational view of the thread forming mechanism;

Fig. 13 is a fragmentary plan view of the threading mechanism;

Fig. 14 is a sectional view taken substantially on the line 14—14 of Fig. 13;

Fig. 16 is a sectional view on the line 16—16 of Fig. 15;

Fig. 17 is a horizontal sectional view on the line 17—17 of Fig. 15;

Fig. 18 is a fragmentary elevational view of the vertical adjusting means for the thread forming mechanism;

Fig. 19 is a sectional view on the line 19—19 of Fig. 18;

Fig. 20 is a perspective view of the threading mechanism showing the threaded plug advances;

Fig. 21 is an elevational view of one of the articles produced by the machine;

Fig. 22 is a fragmentary elevational view, partly in section, showing a slightly modified form of construction;

Fig. 23 is a sectional view on the line 23—23 of Fig. 22;

Fig. 24 is a side elevational view of a further modified form of construction;

Fig. 25 is a view similar to Fig. 24 showing the parts in a slightly different position;

Fig. 26 is a view similar to Fig. 24 showing a further modified form of construction;

Fig. 27 is a side elevational view, partly in section, of a still further form which the invention may assume;

Fig. 28 is a fragmentary side elevational view showing a further embodiment of the invention; and Fig. 29 is an end elevational view of the structure shown in Fig. 28.

Figure 1:
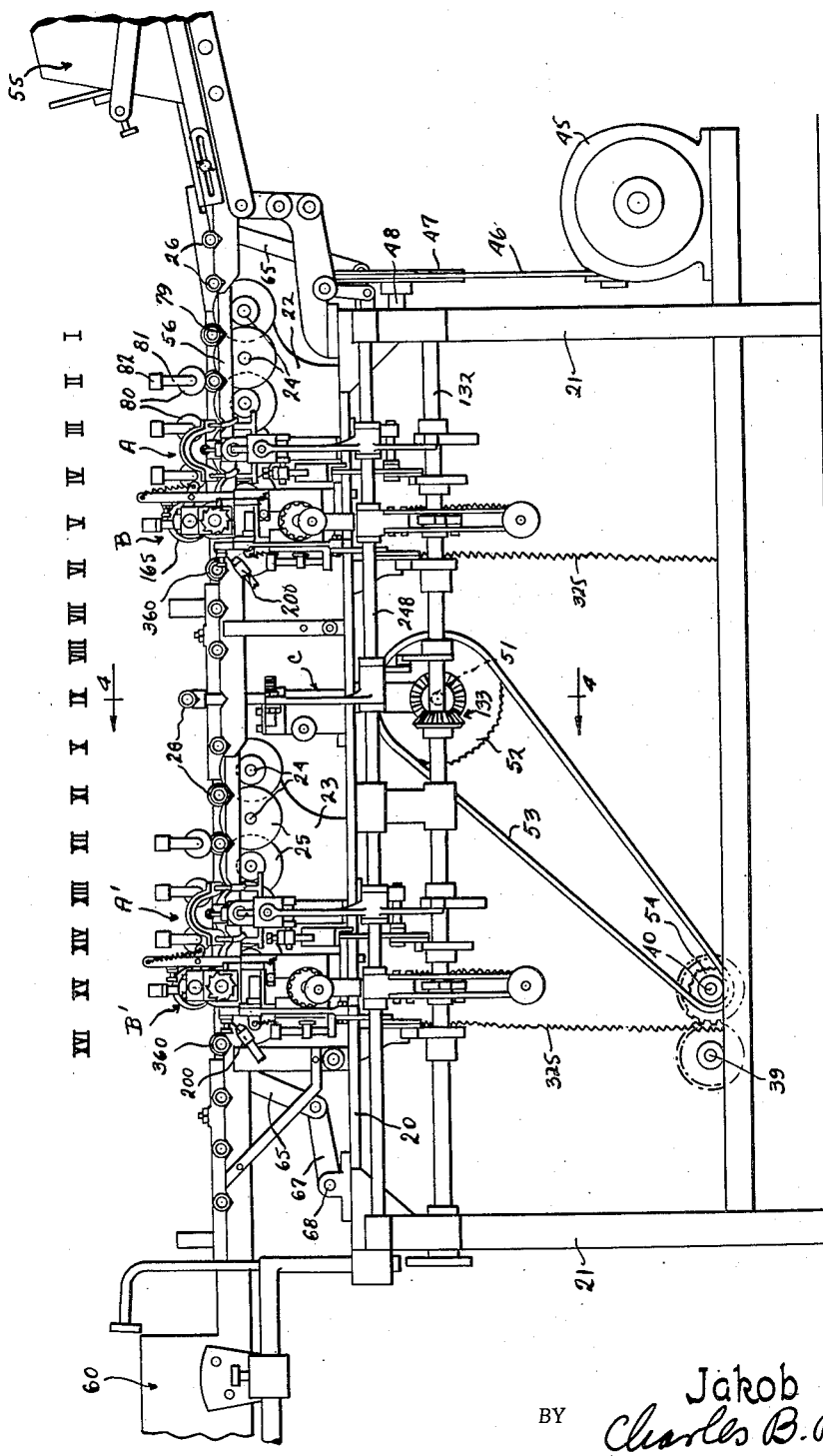
Fig. 1 is a side elevational view of a machine constructed in accordance with the teachings of this invention.

Heretofore it has been customary to package tablets and the like in small bottles or vials having reduced neck portions. Such vials have not been particularly satisfactory for the reason that the neck or outlet opening of the vial has been smaller than the body portion of the vial, thereby providing an inner shoulder against which the tablets contacted when it was attempted to remove the tablets from the vial. Further, the tablets have not been guided sidewise, that is, they have not been prevented from moving laterally in the bottle or vial so that when the bottle became partly empty, the tablets were able to shift or move laterally, frequently becoming broken during shipping or storing.

Under the teachings of the present invention there is produced a vial of constant internal diameter from its base to its mouth outlet opening. In fact, if desired, the mouth of the vial may be even larger than the internal diameter of the body of the vial.

With a vial constructed as above mentioned it is possible to so form the vial body that the edges of the tablet engage the inner wall of the vial, whereby, the tablets are prevented from moving laterally and thus becoming broken. The tablets may be discharged from the vial by merely removing the cap of the vial and then tipping the open mouth of the vial downwardly, the tablets being guided in their movement throughout their entire travel through the vial. As previously mentioned, the vial opening is the same diameter as the body of the vial or, if desired, the vial opening may be made slightly larger than the body of the vial, the result being in either case that the tablets are not caused to contact a shoulder when they are discharged from the vial.

Thus the present invention provides an apparatus for producing a vial or the like in which the tablets stored in the vial will be held against lateral movement but in which the tablets may be easily discharged from the vial because of the fact that there are no shoulders or the like between the body portion of the vial and the open end thereof.

Referring first to the method, the invention contemplates the processing of glass tubes of the desired size in such a manner that first the ends to be treated are heated in suitable flames until these ends become plastic. A flaring tool of desired size and shape is then entered into the open heated end of the tube and this tool is then tilted so that a controlled flare may be applied to the mouth of the tube.

It is preferable that the first flaring tool which engages the vial only partially form the desired flare, the tube being then moved into alignment with a second flaring tool which is somewhat larger than that first mentioned and which engages the interior of the open end of the tube and then is inclined upwardly to impart the desired final flare to the tube.

After the tube or vial has been flared to the extent desired, the tube or vial is then moved by suitable transport bars into alignment with a threaded plug. This plug is projected forwardly into the open flared end of the vial or tube and then rollers are brought into engagement with the outer surface of the vial to press the glass which is still hot enough to be plastic, into engagement with the threaded plug.

After the glass has been pressed into the threads on the interiorly inserted threaded plug, the rollers are then removed and the plug is held stationary while the vial or tube is rotated, thus causing the threaded plug to unthread itself from the interior of the vial. The plug is then drawn fully out of the path of movement of the vial and the vial is moved forwardly on the machine out of alignment with the plug and into alignment with an apertured rotatable plate which is arranged to discharge cooling air into the interior of the vial or tube so that the interior and exterior of the vial or tube are both cooled to exactly the same extent.

If the article being processed is a vial, the operation as thus far described completes the article. In other words, a vial is formed, the vial being closed at one end and the other end thereof, being interiorly threaded to provide a neck of the desired diameter.

If, however, a tube is being processed, the present invention contemplates reversing the tube end for end so that the other end thereof is then placed in position to be acted upon by suitable flaring and threading tools with the result that there is provided a tube of a desired length having interior threads formed on each of its two ends. Such a tube is then treated in accordance with the usual practice to divide the same into two sections and to form bottoms on the sections thus produced so that two vials are formed from a single length of tubing.

Figure 2:
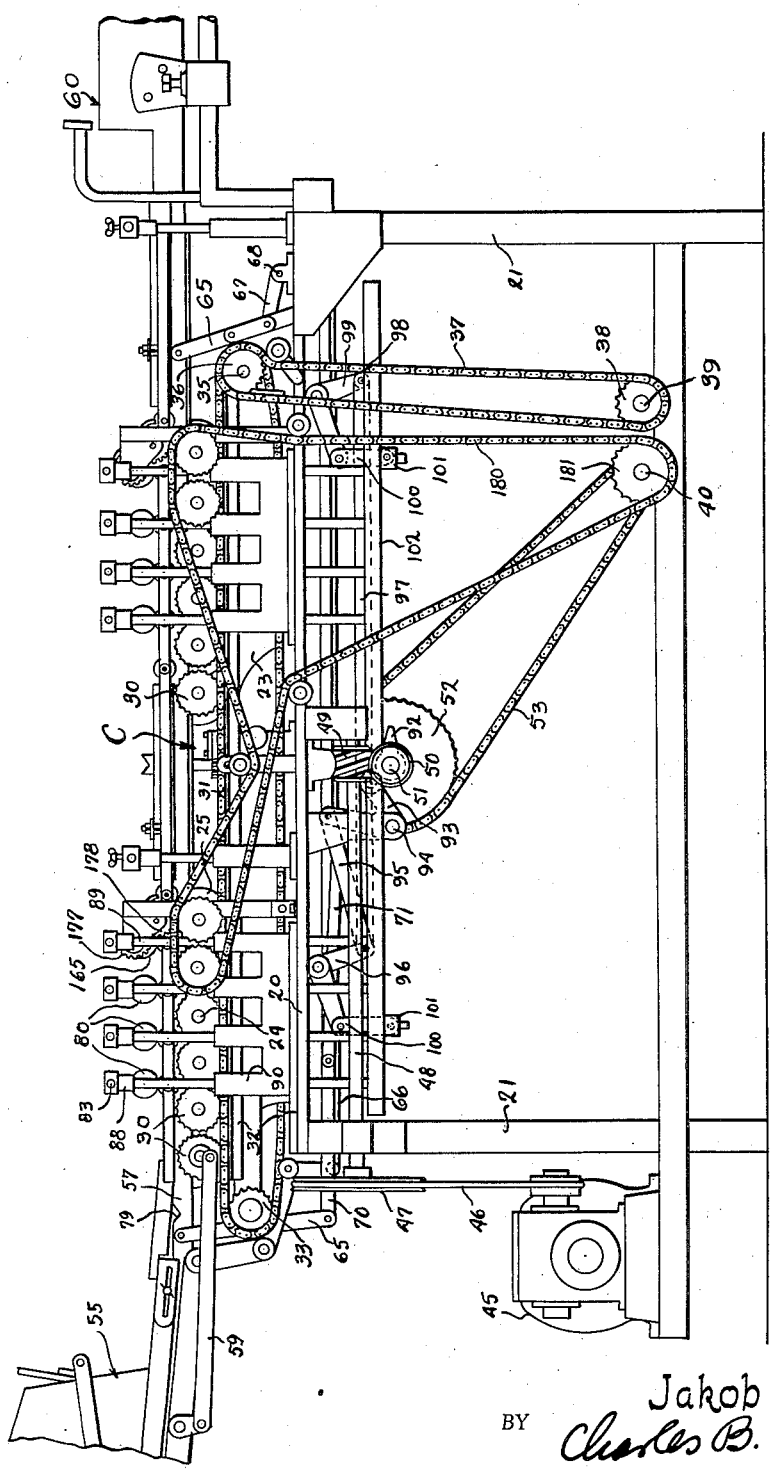
Fig. 2 is a side elevational view of the machine looking at the opposite side thereof from that shown in Fig. 1.
Figure 3:
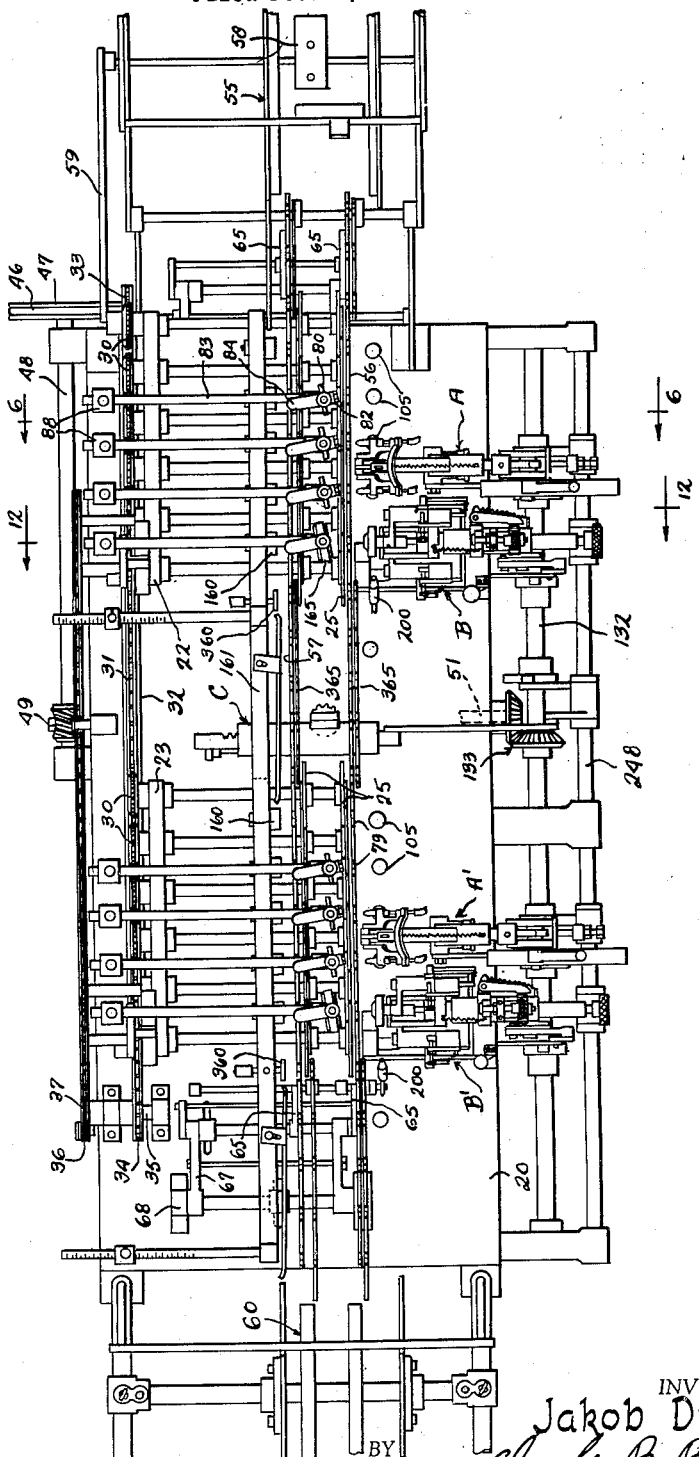
Fig. 3 is a top plan view of the machine.

Referring now particularly to the drawings wherein like reference characters designate corresponding parts throughout all views, and referring more particularly to Figures 1 to 3 inclusive wherein the general arrangement of the machine is illustrated, the numeral 20 designates a suitable baseplate which is supported in spaced relation to the floor in any desired manner, such for example, as by the legs 21.

Carried by and projecting upwardly from the baseplate 20 are standards 22 and 23 which provide suitable bearings for shafts 24. One end of each shaft 24 carries a pair of discs or rollers 25, these discs being of such size that they overlap slightly as illustrated in Figure 1 so as to provide between adjacent discs seats for the vials or tubes 26 which are to be processed. It should be noted that the shafts 24 and associated discs or rollers are arranged in groups, there being one group adjacent the inlet end of the machine and there being a second group adjacent the outlet end of the machine. Intermediate the two groups of rollers or discs, there is provided a means for reversing the vials or tubes end for end so that all of the processing means may be disposed at one side of the machine. It should be noted further that the rollers or discs 25 are all located along one side only of the machine since it is unnecessary for the tube or vial being processed to project beyond the other side of the machine.

It is contemplated that the discs 25 will be rotated to impart rotation to the tubes being processed and for this purpose each shaft 24 is provided at its outer end with a gear 30. Most of the gears 30 are arranged in alignment longitudinally of the machine and are adapted to be driven by a suitable chain 31, the upper reach of which rides on a track 32 disposed immediately below those gears 30, which the chain is adapted to drive. At its one end the chain 31 passes over a suitable idler sprocket 33 while at its other end the chain 31 is driven by a sprocket wheel 34 mounted on a shaft 35. Fixed to the shaft 35 for driving the latter is a sprocket 36 which is driven by a chain 37 from a sprocket 38 fixed to a shaft 39 which extends transversely of the machine and which is driven from a shaft 40 by suitable interengaging gears.

Power for driving the above discussed shafts and gears is obtained from a suitable motor 45 which is connected by the belt 46 to a pulley 47 fixed to a shaft 48 which extends longitudinally of the machine to substantially the center thereof. Shaft 48 carries at its free end a worm 49 which engages a worm wheel 50 on a transversely arranged shaft 51. Shaft 51 carries a sprocket 52 which through a chain 53 drives a sprocket 54 fixed to the shaft 40.

The machine is provided at its one end with a suitable magazine 55 from which tubes or vials are fed to transport bars 56 and 57 which periodically move the vials throughout the length of the machine, depositing them momentarily in the seats between adjacent rollers or discs 25.

The magazine may be provided with a suitable agitating means 58 adapted to be driven from one of the adjacent gears 30 by a suitable eccentrically mounted connection 59.

At its opposite end the machine is provided with a suitable discharge means 60 which may be of any desired character and which is adapted to receive the vials after they have been processed.

As the vials move longitudinally of the machine from the feed end to the discharge end thereof, they are first acted upon by a suitable flaring mechanism designated generally by the reference character A. After the end of the tubes or blanks have been properly flared, the blanks are then moved longitudinally of the machine a distance sufficient to place them in position to be acted upon by the mechanism which forms inner threads on the vials or blanks. This mechanism is designated by the reference character B and will be more fully described hereafter.

The blanks are then moved longitudinally of the machine until they reach substantially the center of the machine where they are acted upon by the reversing mechanism designated generally by the reference character C. This mechanism reverses the blanks end for end so that during their further travel through the machine their opposite ends may be processed. Thus after the tubes have been reversed end for end, they are subjected to the action of a second flaring mechanism, A', and then to the action of a second inner thread forming mechanism, B'.

As previously mentioned the tube blanks are moved longitudinally of the machine by suitable transport bars. While the action of transport bars is well known in the art, reference may be made to Figure 5 wherein there is diagrammatically illustrated the manner in which these bars move. If the bars are observed from the rear of the machine or as viewed in Figure 2 it will be found that they move as indicated by the arrows in Figure 5; namely, upwardly, then toward the right, then downwardly and then toward the left.

The means for moving the transport bars is also shown diagrammatically in Figure 5 and also partly in Figure 2 of the drawings. By reference to these figures, it will be noted that the transport bars are secured to the ends of links 65, these links being secured at their other ends to the ends of a longitudinally extending link 66. Intermediate their ends, the links 65 are secured to the ends of bell-crank levers 67 which are pivoted at at 68 to a stationary part of the machine frame. The other ends of the bell-crank levers are pivoted as at 69 to opposite ends of a link 70 which extends longitudinally of the machine in substantial parallelism to a link 66.

The link 70 is adapted to be reciprocated longitudinally by a link 71 which is connected to one end of the bell-crank lever 72, the other end of this bell-crank lever being provided with a roller which engages a cam 73 fixed to the shaft 51. A second cam 75 on shaft 51 is adapted by means of the bell-crank lever 76 to move the link 78 to longitudinally reciprocate the link 66 as will be clearly apparent. The cams 73 and 75 are so arranged that the links 66 and 70 are reciprocated in such a manner that the transport bars are moved upwardly, then forwardly of the machine, and then downwardly and rearwardly until they reach their initial position. The transport bars are, of course, provided with notches or recesses 79, in which the tubes rest so that the transport bars deposit the tubes successively in the seats provided by the discs 25.

By reference to Figures 1 to 3 inclusive, it will be noted that rollers 80 engage the tube blanks to hold the latter in engagement with the discs 25. Each roller 80 is journaled in a suitable bracket 81 which is mounted for rotative adjustment in a fitting 82. Each fitting is carried by one end of an arm 83, there being provided a suitable lever 84 fixed to each bracket 81 to provide for rotative adjustment of the same. A set screw 85 is associated with each fitting to hold its respective bracket in adjusted position.

The other ends of the arms 83 are fixed by fittings 88 to the upper ends of the rods 89 which are mounted for vertical reciprocation in bearings 90 fixed to the base plate 20. It will be apparent that, when the rods are moved upwardly, they will lift the rollers 80 out of engagement with the tube blanks, thus permitting the transport bars to move the tube blanks longitudinally of the machine or from one processing station to the next adjacent processing station in the direction of travel of the tube blanks through the machine.

Figure 6:
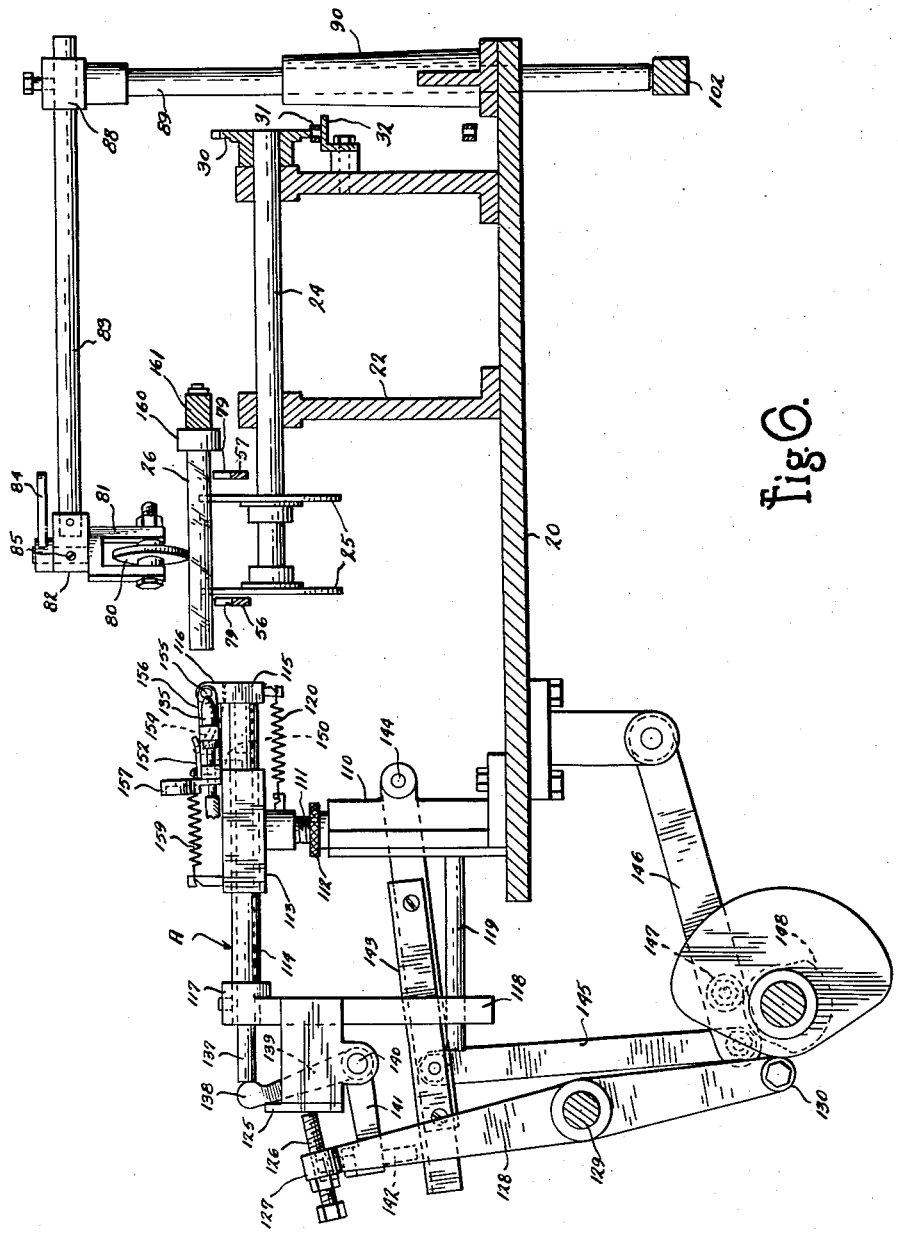
Fig. 6 is a sectional view taken substantially on the line 6—6 of Fig. 3, but showing the flaring tools retracted.

The mechanism for vertically moving the rods 89 is shown most clearly in Figures 2, 4, and 6. Fixed to the shaft 51 is a cam 92 which is arranged to actuate a bell-crank lever 93 which is pivoted as at 94 to a part of the machine framework. The free end of bell-crank lever 93 is connected by a link 95 to one end of a second bell-crank lever 96. At the point where link 95 is connected with the bell-crank lever 96, the link is also connected to one end of the longitudinally extending link 97 which is pivotally connected as at 98 to the bell-crank lever 99 similar to the bell-crank lever 96. The bell-crank levers 96 and 99 carry at their free ends depending links 100 to the lower ends of which are secured lugs 101 which engage the under surface of a bar 102 which extends longitudinally of the machine. As illustrated in Figure 6, the lower ends of the rods 89 rest on the bar 102 with the result that as the bar 102 is raised, all of the rollers 80 are moved upwardly and out of engagement with the tube blanks.

To briefly summarize the operation of the structure just above described, it will be apparent that, whenever the bell-crank lever 93 is rocked toward the left as viewed in Figure 2, the link 97 is moved to the left thus so rocking the bell-crank levers 96 and 99 as to raise the bar 102. When, however, the cam-engaging end of bell-crank lever 93 engages the reduced portion of cam 92, bell-crank levers 96 and 99 are rocked in the opposite direction whereby the rollers 80 are permitted to again engage the tube blanks.

During its travel through the machine, each tube blank is caused to stop temporarily at each of 16 stations, identified in Figure 1 by the numerals I though XVI inclusive. At stations I to IV inclusive and at stations XI to XIV inclusive, the end of the blank to be processed is heated by suitable burners 105. At stations V and XV, the end of the tube is heated by a suitably disposed inclined burner and the tube end is then interiorly threaded by the mechanism B or B'. At station VI and XVI, the tube blank is air-cooled by means which will later be described, while at station IX, the blank is reversed end for end by mechanism which will also be described.

Thus, the blank when it enters the machine, is first heated and then further heated and subjected to the action of two flaring tools. The blank then is further heated and subjected to the thread-forming mechanism. Then the blank is cooled, reversed end for end so that the opposite end, thereof, may be processed in the manner immediately above described, the blank being discharged from the machine in the form shown in Figure 21.

As previously mentioned, the blanks, which are preferably glass tubes, open at both ends, are fed to the machine from the magazine 55 and are moved to each of the stations I to XVI inclusive. At all of the stations, except stations VII to X inclusive, the tubes are rotated so that the heat applied to the same will be evenly distributed. At stations I and II, one end of each tube is heated by the burners 105 and then the tube being processed is moved first to station III and then to station IV at each of which stations the heated end of the tube is subjected to the flaring operation by the mechanism A.

This mechanism is shown more particularly in Figures 6 to 10 inclusive and comprises a vertical standard 110, suitably fixed to the bed plate 20. The standard 110 receives a threaded shaft 111 which has at its lower end a squared portion vertically adjustable in the standard. The adjustment may be effected by the nut 112 which bears at its lower end on the top of the standard 110.

The threaded shaft 111 carries at its upper end a bearing 113 which slidingly receives a tubular member 114. Fixed to the right-hand end of the tubular member 114 as viewed in Figure 6 of the drawings is an end plate 115 which is provided with upwardly projecting spaced ears 116 for a purpose which will later be more fully described.

Fixed to the other end of the tubular part is a collar 117 provided with depending spaced arms 118 which slidingly embrace a pin 119 which is fixed to and projects from the standard 110. The depending arms 118 prevent a turning of the tubular bar 114 but permit this tubular bar to be moved longitudinally through the bearing 113.

A spring 120 secured to the end plate 115 and to the bearing 113 normally urges the tubular bar 114 to the left as viewed in Figure 6 or, in other words, away from the blank-supporting rollers 25. For the purpose of moving the tubular bar 114 inwardly toward the rollers 25 against the force as exerted by spring 120, there is provided the following structure. Carried by the collar 117 and spaced to the left, thereof, as viewed in Figure 6, is a plate 125 adapted to be engaged by the end of the bolt 126 which is threaded in a head 127 carried by the upper end of the lever 128. The lever is pivotally mounted intermediate its ends as at 129 and carries at its lower end a roller 130, which engages a cam 131 fixed to the shaft 132. The shaft 132 extends longitudinally of the machine and at one side, thereof, and is driven by beveled gears 133 fixed to the shafts 51 and 132.

It will be apparent that as the cam 131 is rotatively driven, the tubular shaft 114 will be periodically urged toward the rollers 25 against the force of spring 120. When the roller 130 rides on the low portions of the cam 131 the spring 120 will return the carriage to its retracted position as shown in Figure 6.

Figure 7:
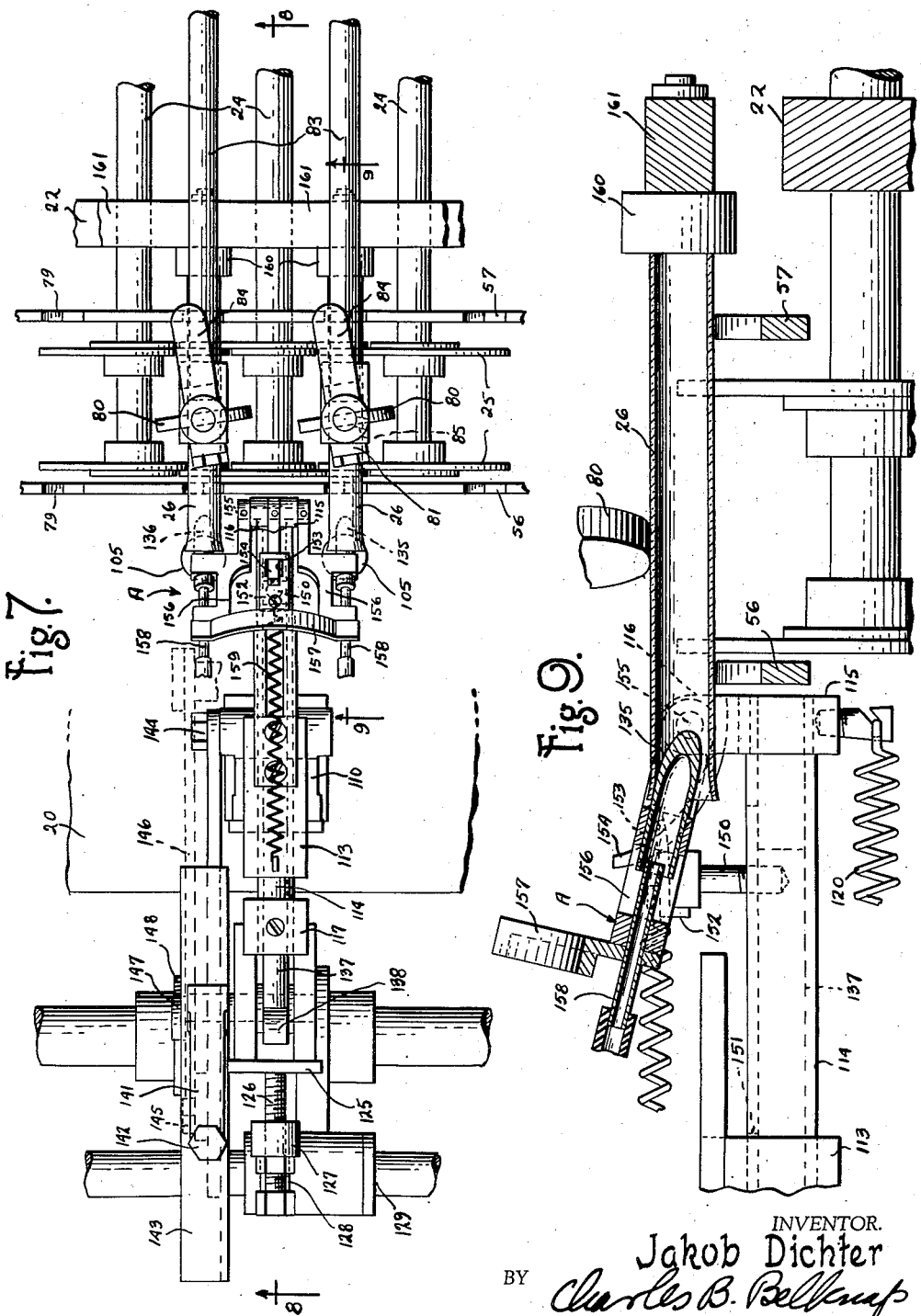
Fig. 7 is a fragmentary top plan view of the structure shown in Fig. 6, the flaring tools, however, being shown forward and inclined.
Figure 8:
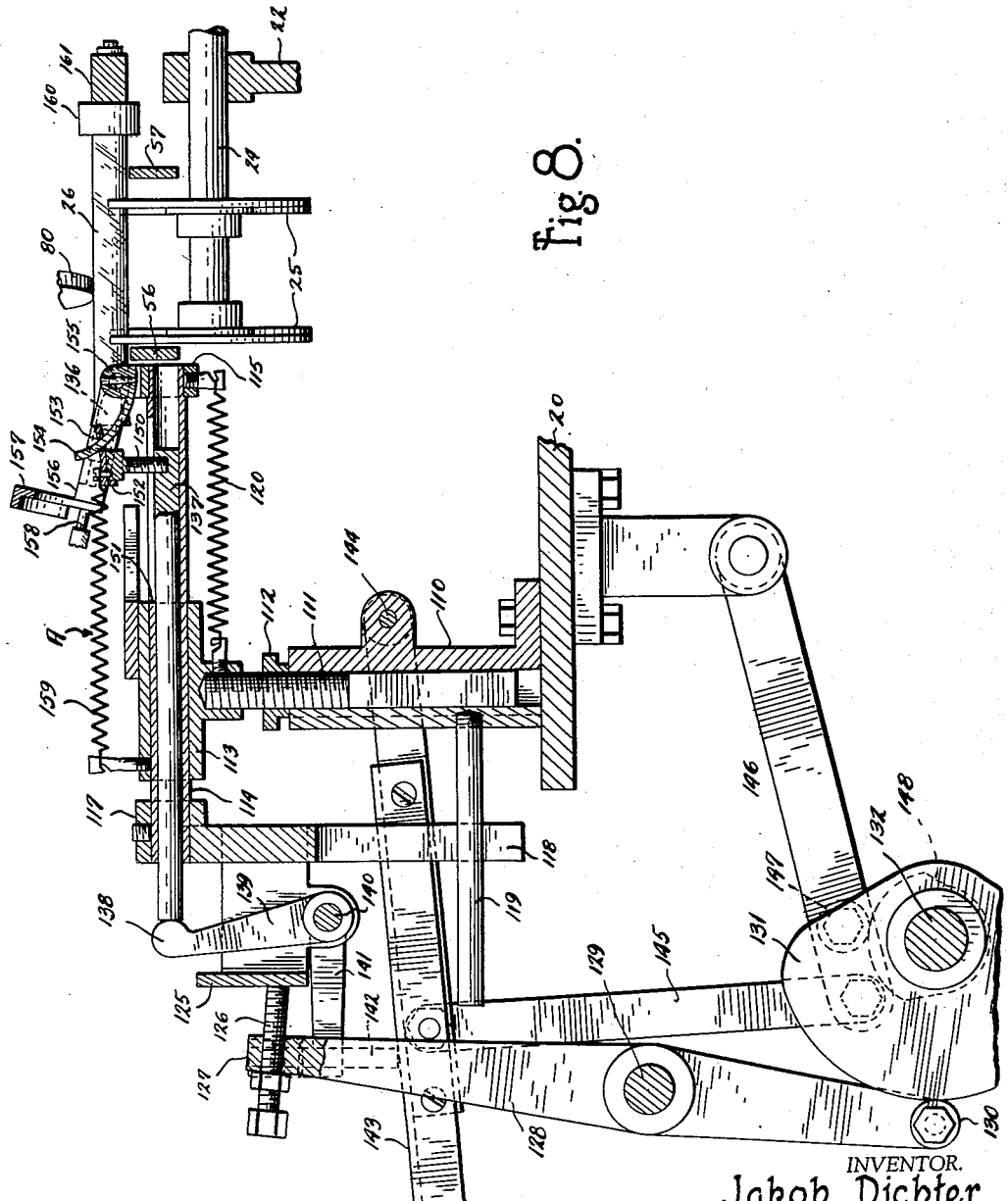
Fig. 8 is a fragmentary sectional view on the line 8—8 of Fig. 7, showing the flaring tools forward and inclined.

In operation, the flaring tools which are shown more particularly in Figures 7, 8, and 9 and which are designated by the reference characters 135 and 136 are first inserted in the open end of the tube being processed and are then inclined upwardly to impart the desired flare of the tube. It will be understood that the tube is first acted upon by the flaring tool 135 and that the tube is then acted upon by the flaring tool 136. The tools may differ somewhat in size and may be inclined to different degrees so that the tool 135 imparts a partial flare to the tube while the 136 tool imparts a final flare to the tube.

For the purpose of imparting the above movement to the flaring tool, there is provided in addition to the structure just above described, the following structure. Mounted for sliding movement longitudinally of the tube 114 is a rod 137 which projects beyond the outer end of the tube and is adapted to be engaged by the end 138 of the lever 139. This lever is fixed to the shaft 140 which is journaled in the supports for the plate 125 and has fixed to its one end an arm 141 through the end of which there is threaded a bolt 142. The lower end of this bolt is adapted to be engaged by the upper surface of the arm 143 which is pivoted as at 144 to the standard 110. For raising and lowering arm 143, there is provided a link 145 which is secured at its lower end to a pivotally mounted link 146. The link 146 carries a roller 147 adapted to ride on a cam 148 fixed to the shaft 132. The arrangement is such that the link 145 will periodically be vertically reciprocated thus raising the arm 143 and causing the lever 146 to force the rod 137 to the right as viewed in Figure 6.

Adjacent its inner end, there is fixed to the rod 137 a pin 150 which projects upwardly through a slot 151 formed in the tube 114. The head of the pin 150 carries a plate 152 which is provided with an opening 153 through which a curved arm 154 is arranged to move. The arm 154 is pinned to the shaft 155 which is journaled in the ears 116 of the end plate 115. Likewise, pinned to the shaft 155 are arms 156 each of which carries one of the flaring tools 135. The arms 156 are secured to a strap member 157 and this strap member is provided with clamping means for supporting conduits 158 for supplying cool air to the interiors of the flaring tools. It will be obvious that if desired, one arm 156 may be initially located at an inclination differing slightly from the inclination of the other arm 156 whereby one flaring tool will be inclined to a greater degree than the other when the rod 137 is fully advanced. If this is not desired, obviously one flaring tool may be made larger than the other as previously mentioned.

The normal position of the parts of the flaring mechanism are shown in Figure 6. It will be noted with reference to this figure that the tubular member 114 is fully retracted by the spring 120 while the rod 137 is fully retracted by virtue of the spring 159 which is secured at its one end to the bearing 113 and at its other end to the plate 152. It will also be noted that the flaring tools are horizontally positioned and are, of course, also retracted so that they are not exposed to the heat of the burners 105. The rollers on the levers 128 and 146 are on the low parts of their respective cams, while the arm 143 is lowered so that it does not contact the lower end of bolt 142.

During the travel of the tube through the machine, the tube is held against rollers 160 carried by a guide rail 161 by virtue of the inclination of the superposed rollers 80. This insures that at stations I and II, the tube end to be processed will be properly located with reference to the burners 105. At station III the tube is further heated and is acted upon by the flaring tool 135.

Figure 10:
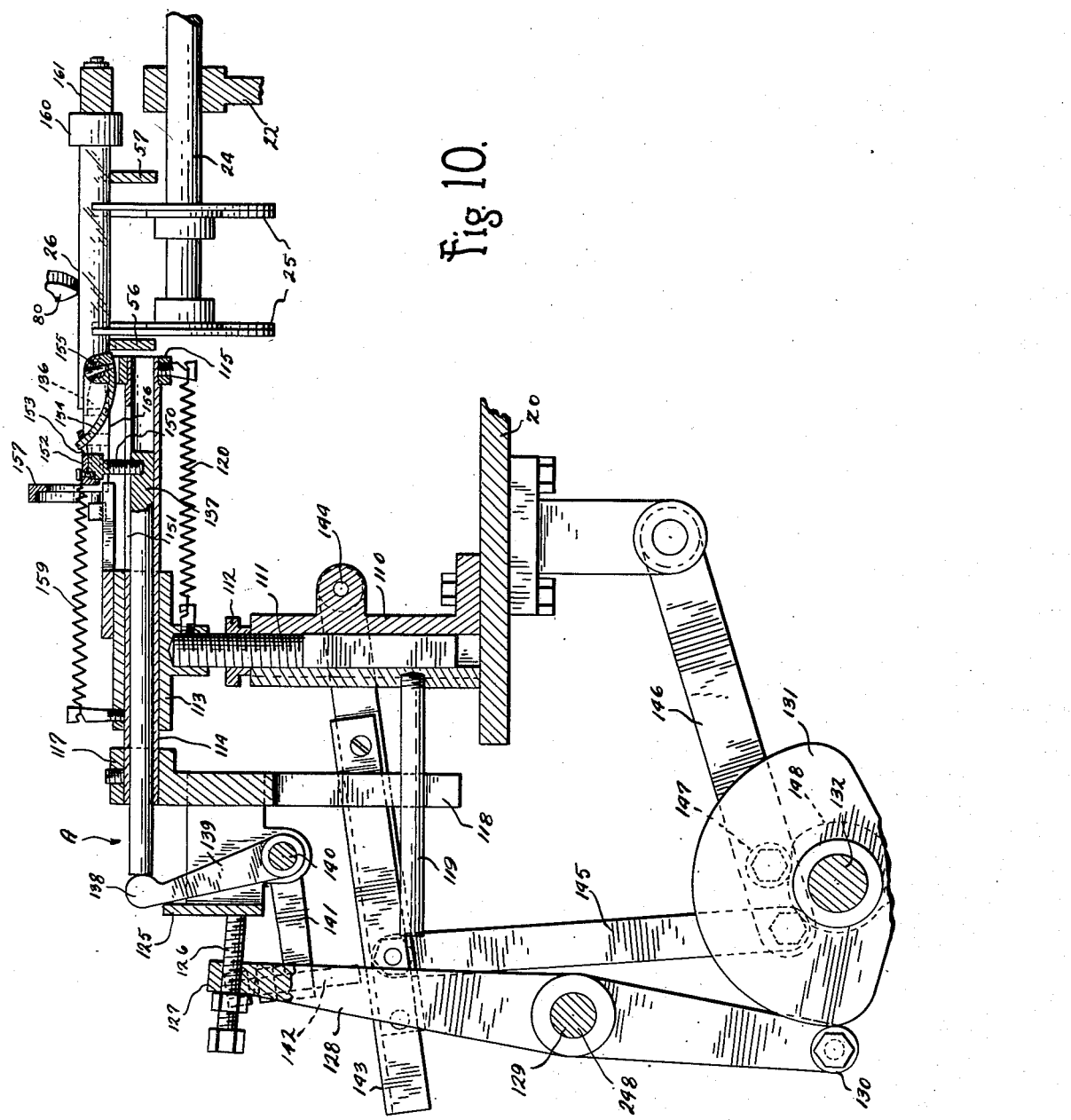
Fig. 10 is a view similar to Fig. 8, showing the flaring tools forward but not inclined.

This occurs by virtue of the fact that after the tube has been fully positioned at station III, the tubular member 114 is first moved by lever 128 and cam 131 to the position shown in Figure 10. The movement of the tubular member to this position causes the tool 135 to be inserted into the end of the tube blank and ready to be inclined to the position shown in Figure 9.

It will be apparent that the rod 137 and the lever 138 have also moved forwardly since the lever is carried by the supports for the plate 125. The cam 148 now causes the link 145 to be elevated, thus raising the arm 143 and causing a rocking of the lever 139 through the medium of the threaded bolt 132 and the lever arm 141. This causes the rod 137 to move forwardly relative to the tube 114 and by virtue of the extension of the curved arm 154 through the opening 153 in plate 152 causes a predetermined rocking of the shaft 155 and thus an inclination of the tool 135 to the angle desired. Thus the tube is initially flared to some predetermined angle. The tube blank is then moved to station IV where it is further heated by a burner 105 and where it is engaged by the tool 136 in the same manner as it was engaged by the tool 135. The tool 136 flares the tube to the final desired angle and, as previously mentioned, this may be occasioned by making the tool 136 larger than tool 135 or by having the initially positioned tool 136 slightly inclined rather than horizontally positioned as is tool 135.

From station IV the blank which has now been properly flared, is moved to station V where it is subjected to the action of the inner thread-producing mechanism B. At this station the tube is rapidly rotated and for this purpose, there is provided a roller 165 having a friction-inducing surface formed of rubber or some similar material. As in the case of the rollers 80, the roller 165 is supported from a rod 83 and is adapted to be raised and lowered by the rod 89 which rests at its lower end on the bar 102.

The roller 165, however, instead of being merely journaled in its supporting bracket for rotation by virtue of its engagement with the blank, is adapted to be rapidly rotatively driven. Thus the roller is journaled in the bracket 166 which differs from the brackets 81, utilized for the rollers 80. The bracket 166 is adapted to be rotatively adjusted by virtue of the lever 84 fixed to the stem of the bracket 166, this stem being rotatively mounted in the head 82. There is, of course, a suitable means such as a set screw 85 for holding the bracket in its adjusted position.

The roller 165 is carried by a shaft 167 and this shaft is connected by a universal joint 168 to one end of the shaft 169 which is telescopically received in the tubular shaft 170. A pin, or the like, 171, carried by the tubular shaft 170 engages in a slot or groove 172 in the shaft 169 to provide for sliding movement of the shafts relative to each other while preventing relative rotation between these shafts.

The tubular shaft 170 is connected by virtue of the universal joint 175 to the shaft 176 to which is fixed a gear 177. This gear meshes with a gear 178 which in turn meshes with gear 179 fixed to the adjacent disc-driving shaft 24. As previously mentioned, while most of the gears 30 for driving the shafts 24 were arranged in alignment longitudinally of the machine and were adapted to be driven by a chain 31, the shafts 24 driving the discs forming the seats opposite threading mechanisms B and B', are elongated as clearly illustrated in Figure 12 and are separately driven by a chain 180 which, as shown in Figure 2 of the drawings, is driven from the shaft 40. Since the shaft 40 preferably rotates at a higher speed than the shaft 39 and since sprocket wheel 181 which drives the chain 180 is larger than the sprocket wheel 38, the four driven shafts 24 which drive the discs opposite the threading mechanism, rotate at a higher speed than do the other tube-supporting discs of the machine. It will also be apparent that since the gear 179 is fixed to one of the high-speed shafts 24, the roller 165 will also be rapidly rotated, thus causing a rapid spinning of the tube blank about its axis.

When the tube is positioned at station V, as previously mentioned, it is rapidly rotated and heated by a suitable inwardly-disposed burner 200. After the tube has been heated to the proper extent, it is the function of the threading mechanism to insert a threaded plug in the end of the tube and then to cause rollers to engage the outside of the tube so that the glass is pressed into the threads of the threaded plug. The mechanism for accomplishing this function is shown more particularly in Figures 11 to 20 inclusive.

Figure 12:
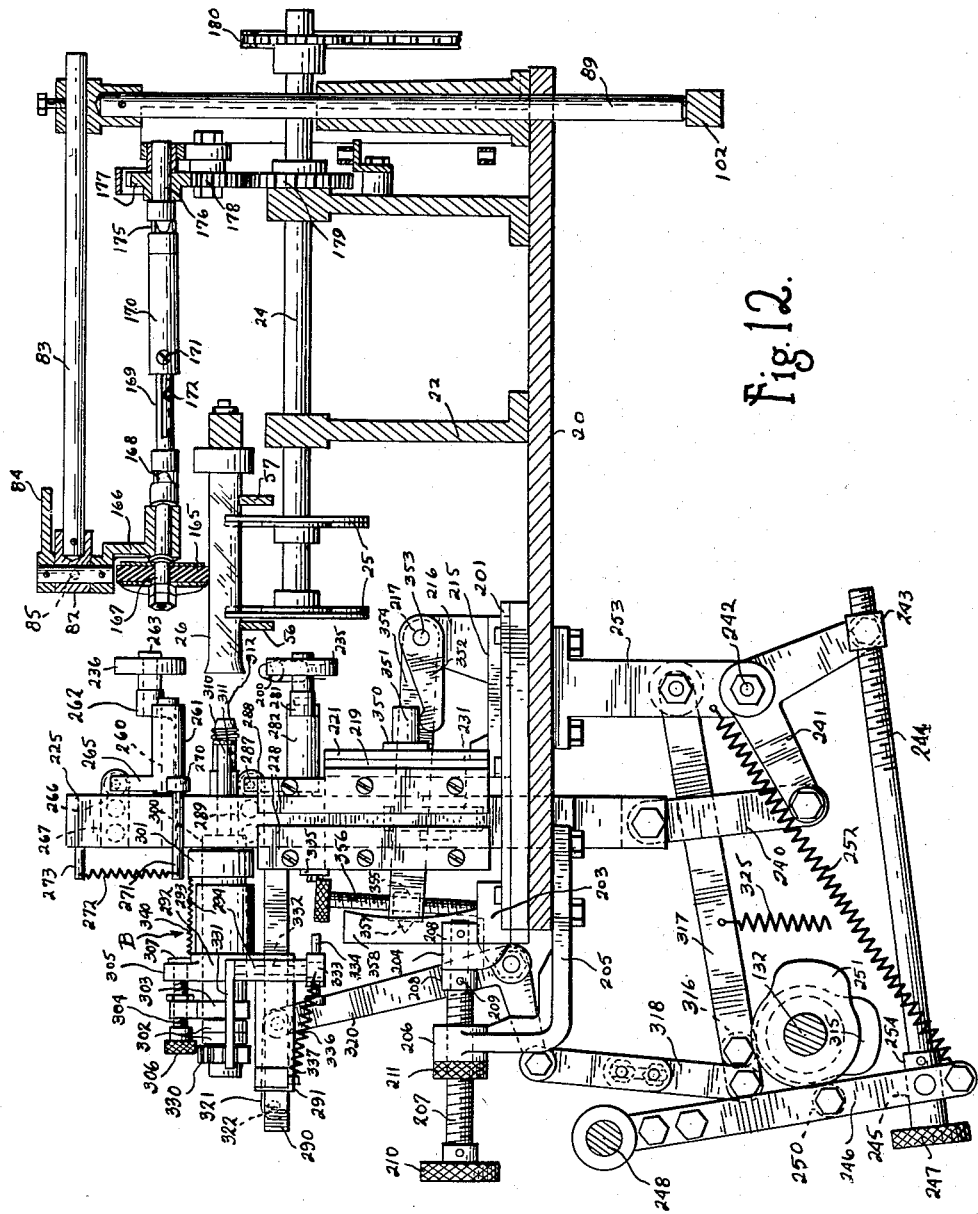
Fig. 12 is a transverse sectional view taken substantially on the line 12—12 of Fig. 3.

Referring first to Figures 11 and 12, it will be noted that there are provided L-shaped bars 201 extending transversely of the bed plate 20 to form a way for the plate 202. This plate is adapted for adjustment transversely of the bed plate and for this purpose, there is fixed to the front edge of the plate as by bolting or the like, a plate 203 which is provided with upstanding ears 204. Secured to the side is a bracket 205 which extends forwardly beyond the bed plate, then upwardly and terminates in a threaded bushing 206 which is in alignment with the upstanding ears 204. A shaft 207 is threaded through the bushing 206 and extends between the ears 204 being provided on opposite sides of the ears with washers 208 which are fixed to the threaded shaft by any suitable means such as set screws 209. The outer end of the threaded shaft 207 is provided with a knurled knob 210 it being apparent that upon rotation of the threaded shaft by means of the knob, the plate 202 may be adjusted transversely of the bed plate. To lock the plate in adjusted position, there may be provided a lock nut 211 threaded on the shaft 207 and adapted to engage the bushing 206.

Fixed to the upper face of the plate 202 and adjacent the rear edge, thereof, is a plate 215 provided with an upstanding arm 216 which forms a bearing 217 for a purpose which will later be described. The plate 215 carries at a point forwardly of the upstanding member 216, a vertically disposed plate 218. The plate 218 is of substantial thickness and constitutes a guide for the vertically adjustable block 219. The structure of this block is shown more fully in Figures 14 and 19 wherein it will be noted that this member comprises a substantially solid block provided with a cut-out portion or recess 220 adapted to slidably receive the upstanding plate 218. The plate 218 is held in the recess 220 by suitable metallic strips 221 which over-hang the recess and form therewith, a way for the plate 218.

At its opposite sides, the block 219 is recessed to receive rack bars 225 and 226, these rack bars being held in position by additional strips 227 and 228 secured to the adjacent faces of the block.

The rack bars are adapted for vertical movement in the block 219 and are provided on their inner faces with rack teeth 230, these teeth engaging a gear 231 located in a recess 232 formed in the block 219 adjacent the lower end thereof. The gear is rotatively mounted on the shaft 233, which has a threaded end, threaded into the adjacent portion of the block 219.

It will be apparent that, with the rack bars connected in the manner described, when one rack bar is raised, the other will be lowered and that further, these movements are of equal extent. These rack bars are, therefore, utilized to move the rollers 235 and 236 toward and away from each other during the forming of the threads on the tube blank.

For reciprocating the racks in their respective guideways, rack 226 has secured to its lower end a link 240 which is connected pivotally to one end of the bell-crank lever 241. This bell-crank lever is suitably pivotally mounted as at 242 on a bracket which depends from bed plate 20. The other end of the bell-crank lever 241 is secured to the pivot block 243 which is threadedly mounted on one end of the rod 244 which extends forwardly and passes through a block 245, pivotally mounted between two spaced arms 246. The rod 244 is provided on its other end with a knurled knob 247 having an extended portion adapted to engage the block 245. It will be apparent that by rotating the rod 244, the effective distance between the arms 246 and the block 243 may be adjusted at will.

The spaced arms 246 are pivotally mounted at their upper ends on a rod 248 which extends longitudinally of the machine, parallel to and spaced from the cam shaft 132. The spaced arms 246 also carry a roller 250 adapted to engage a cam 251 which is fixed to the cam shaft 132. The lower ends of the arms 246 are connected by the spring 252 to the depending bracket 253 which, as previously mentioned, provides a pivot for the bell crank 241. The arrangement is such that the spring 252 holds the roller 250 firmly against the cam 251. As the cam rotates and its high part engages the roller 250, the arms 246 are moved to the left as viewed in Figure 12, thus moving the rod 244 to the left and rotating the bell crank 241 to elevate rack bar 226 by means of link 240. The raising of rack bar 226, through the medium of gear 231 lowers rack bar 225, with the result that the rollers 235 and 236 which are carried by the rack bars, will be brought closely together and thus into engagement with the end of the tubular blank being processed.

It will be obvious that, when the roller 250 again reaches the low part of cam 251, spring 252 will move the bars 246 toward the right as viewed in Figure 12. To insure that the rod 244 will be correspondingly moved to thus effect a lowering of the rack bar 226, a collar 254 is pinned or otherwise secured to the rod 244 so as to engage the block 245 on the side thereof, opposite from the side which is engaged by the knurled knob 247. It will be understood that the rack bars 225 and 226 are movable through suitable openings formed in the plate 202 and the bed plate 20.

As previously mentioned, the rollers 235 and 236 are carried by and are movable with the rack bars 226 and 225 respectively. If reference be made to Figure 20, it will be noted that the upper roller 236 and rack bar 225 is provided with a laterally projecting pin or shaft 260 on which is journaled a sleeve 261 which carries at its one end an arm 262 which terminates in a bearing in which the shaft 263 of the roller 236 is journaled. At its other end, the sleeve 261 carries an upstanding arm 265 adapted to abut a bolt 266, threaded through plate 267, fixed to the rack bar 225. The bolt 266 limits rotation of sleeve 261 on shaft 260 and thus limits the downward movement of roller 236. Obviously, the bolt may be adjusted to vary the movement which may be imparted to roller 236.

The sleeve 261 is also provided with a laterally extending projection 270 which carries a pin 271 which extends across and in front of the rack bar 225. Connected to the free end of this pin 271 is a spring 272, the other end of which is connected to the pin 273, secured to the rack bar 225 adjacent the upper end thereof. It will be apparent that the spring tends to rotate the sleeve 261 with shaft 260 and to thus urge the roller 236 downwardly or into engagement with the tube being processed. Thus the roller 236 engages the glass end, due to the force exerted by the spring rather than a direct mechanical connection.

The lower roller 235 is secured to the lower rack bar in a manner similar to the manner in which the upper roller is secured to the upper rack bar. Thus the lower roller is carried by a shaft 280 which is journaled in one end of the arm 281 which projects laterally from a sleeve 282 which is rotatively mounted on the pin 283 which is fixed to and projects laterally from the lower rack bar 226. The sleeve 282 is also provided with a laterally extending ear 284 to which is attached a spring 285, the other end of which is secured to the pin 286, carried by the rack bar 226. Thus the spring 285 tends to rotate the sleeve about the pin 283 and tends to urge the roller 235 toward the roller 236.

The sleeve 282 is also provided with an upstanding arm 287 which is arranged to be engaged by end of the bolt 288 which is threaded through a plate 289 carried by a rack bar 226. Thus rotative movement of the sleeve about the pin 283 is limited by engagement of the arm 287 with the bolt.

From the above it will be apparent that as the lower rack bar 226 is elevated, the upper rack bar 225 is lowered, the rollers 235 and 236 being drawn relatively close together. The springs 272 and 285 rotate the rollers about the axes on which they are mounted, thus resiliently forcing the rollers into engagement with the glass tube.

Figure 15:
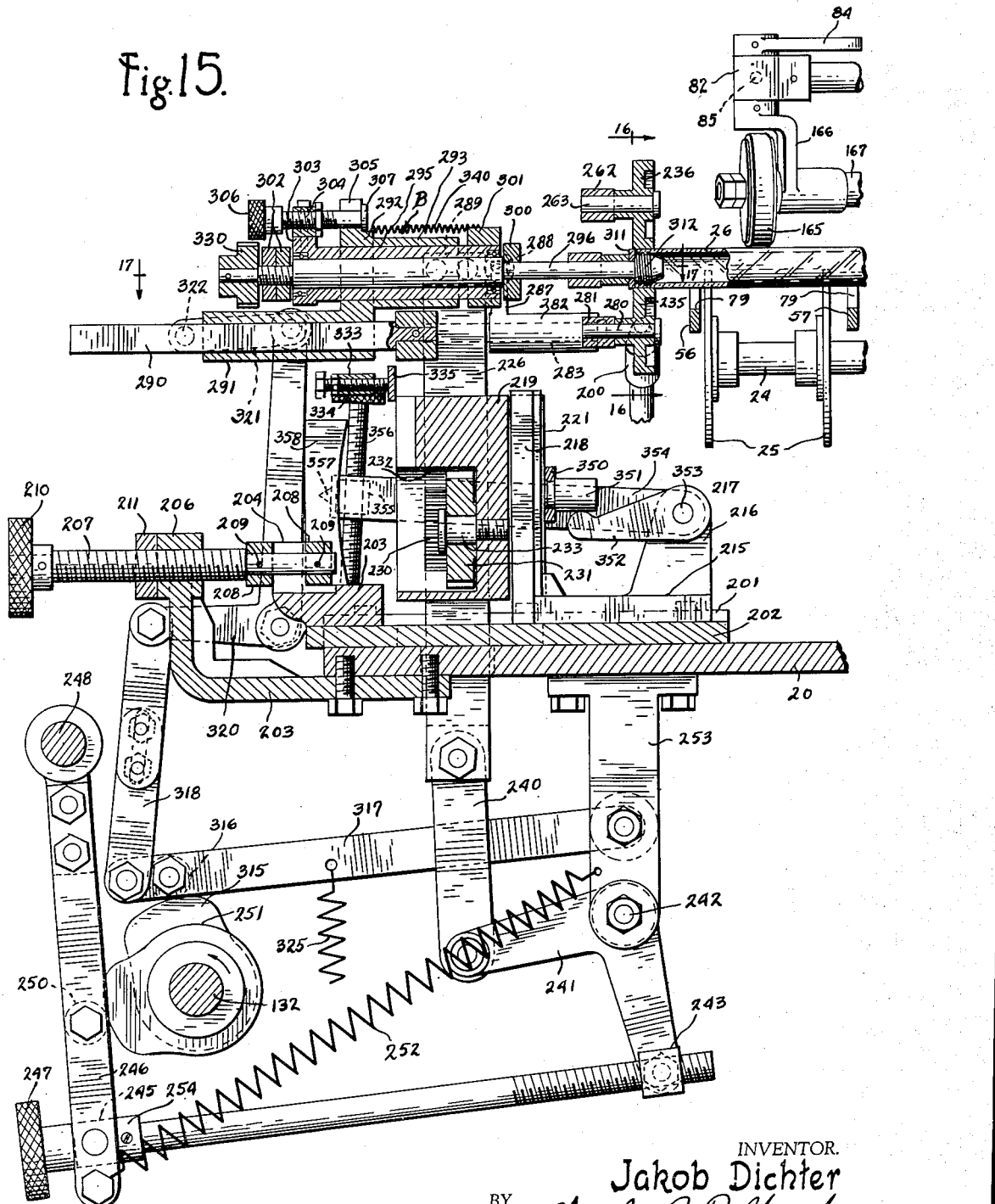
Fig. 15 is a sectional view on the line 15—15 of Fig. 11, showing the tool advanced and the rollers engaging the vial.

Referring now to the thread plug which is to be inserted in the end of the glass tube and to the mechanism by which this plug is actuated, reference should be made to Figures 12, 13 and 15. It will be noted that projecting from the block 219 adjacent the upper end thereof, is a bar 290. Slidably mounted on this bar for movement longitudinally thereof, is a block or carriage 291 which provides at its one end an upstanding portion 292 which carries a bearing 293. The upstanding portion 292 is provided with a lateral extension 294 in which is journaled a shaft 332 for a purpose which will later be described. Slidably mounted in the bearing 293 is a tubular sleeve 295 which provides a bearing for the tool shaft 296. The shaft 296 is fixed for sliding movement with the sleeve or bearing 295 by virtue of the collar 300 which abuts a collar 301 on one end of the sleeve 295 and by virtue of collars 302 which abut an upstanding plate 303 formed on the other end of the sleeve 295. The upstanding plate 303 is provided with a threaded opening through which a bolt 304 is threaded, this bolt extending between ears 305 which project upwardly from the portion 292 of the carriage 291. The bolt 304 is provided at its one end with a knurled knob 306 by which it may be rotated and is provided at its opposite end with a head 307 which engages the upstanding ear 305 so that rotation of the bolt effects an adjustment of the sleeve 295 longitudinally of the bearing 293.

Projecting from the inner end of the member 301 are arms 310 which are connected at their ends by a cross bar 311 through which the shaft 296 extends. The shaft is journaled in the cross bar 311 and carries at the end a threaded plug 312 which is adapted to be inserted into the open end of the tube.

The carriage 291 and the threaded plug carried thereby, are adapted to be moved forwardly from the position shown in Figure 12 to the position shown in Figure 15. For this purpose there is provided a cam 315 engaging a roller 316 carried by the link 317 pivotally mounted at its one end to the depending bracket 253. At its other end the link 317 is connected by means of the link 318 to the bell-crank lever 320. The other end of the bell-crank lever is pivotally connected to the link 321 which in turn is pivotally connected as at 322 to the carriage 291. The arrangement is such that when the high part of the cam 315 engages the roller 316, the carriage is moved forwardly thus forcing the plug 312 into the open end of the tube being processed. When the low part of the cam 315 is engaged by the roller, the link 317 is pulled downwardly by the spring 325 thus returning the carriage and its associated parts to their original position.

It is contemplated that when the threaded plug is inserted in the heated open end of the glass tube, it will rotate with the tube until the inner threads are formed, whereupon the rotation of the plug will be stopped permitting the plug to be unthreaded from the tube by virtue of the continued rotation of the tube. For this purpose there is fixed to the end of the shaft 296 a ratchet wheel 330 adapted to be engaged by the pawl 331 fixed to the shaft 332 which is journaled in the previously mentioned lateral extension 294 of the carriage 291. As illustrated in Figure 12 of the drawings, the pawl is secured to the upper end of the shaft 332. At the lower end of this shaft there is secured a cross bar 333 shown more particularly in Figure 17. One end of this cross bar carries a threaded bolt 334 adapted to abut a plate 335 fixed to the bar 219. Connected to the other end is one end of the spring 336, the other end of this spring being connected as at 337 to the carriage 291.

The arrangement is such that when the carriage is moved forwardly to the position shown in Figure 15, the threaded plug is inserted into the open end of the tube and since the bolt 334 engages the plate 335, the pawl 331 is rocked out of engagement with the ratchet wheel 330. Thus the threaded plug may rotate with the glass tube while the rollers 235 and 236 move together and press the glass into engagement with the threaded plug. It might be noted that the threaded plug is inserted in the glass tube prior to the engagement of the rollers with the outer surface of the tube.

After the threading operation is completed, the carriage 291 is moved backwardly and its inward movement frees the engagement of the bolt 334 with the plate 335, thus permitting spring 336 to move pawl 331 into engagement with wheel 330, thus terminating the rotation of shaft 296 and plug 312. Since the glass tube continues to rotate, the threaded plug is unscrewed from the threaded end of the tube and is thus free from engagement with the tube.

To eliminate the plug pulling the glass tube during the initial movement of the carriage 291, a loss-motion connection is provided between the sleeve 295 and the bearing 293. This is illustrated in Figure 12 where it will be noted that the collar 301 is spaced slightly from the end of the bushing or bearing 293. This collar is connected by a spring 340 to one of the ears 305 so that under normal conditions the collar 301 abuts the end of the bearing 293. It will thus be seen that during the initial movement of the carriage 291 away from the tube being processed, the plug may remain in the tube momentarily at least, until the carriage has been moved sufficiently to permit pawl 331 to engage wheel 330 and thus stopping the rotation of the plug. The plug will then be, of course, unthreaded from the tube and will be moved backwardly with the carriage to the position shown in Figure 12.

The block 219 and the mechanism carried thereby is mounted for vertical adjustment on the upstanding plate 218 and for this purpose the following structure is provided. Fixed to one side of the block 219 is a strap 350 to which is secured a plug 351 which projects laterally from the strap. As shown more particularly in Figures 12 and 19, there is provided a lever 352 adapted to engage the plug 351 to move the same and the block 219 upwardly.

The lever 352 is secured to one end of the shaft 353 which is journaled in the bearing 217 formed in the upstanding lug 216. Secured to the other end of shaft 353 is an arm 354 to the end of which is secured a threaded block 355 through which a bolt 356 is threaded. The bolt bears at its lower end on the block 203 so that by properly rotating the bolt, the lever 252 may be rocked and the block 219, either raised or lowered. For the purpose of indicating the degree of vertical adjustment of the block 219, a suitable pointer 357 is formed on the end of the arm 354, this pointer cooperating with suitable indicia formed on an adjacent plate 358.

From the above, it is believed that the structure and operation of the threading mechanism will be clearly understood. After the tube blank has been flared at its end, it is placed on the rollers 25 opposite the threaded plug 312 and rapidly rotated by virtue of the rapid rotation of these rollers and the rapid rotation of the super-roller 165. The end to be threaded is heated to the desired degree by the burner 200 and then the threaded plug is inserted in the heated end of the tube and the rollers are moved into engagement with the outer surface of the tube to press the glass into the threads on the plug. The carriage which moves the threaded plug is then retracted and during the initial portion of its movement, the plug remains in the glass tube so as not to pull the latter out of the machine. The plug is then held against rotation and is drawn outwardly away from the tube, the continued rotation of the tube permitting the plug to thread outwardly.

After one end of the tube has been threaded at station V, the tube is then moved to station VI where air is discharged to the entry thereof, through a roller 360 which is mounted in the bar 161 the same as are the rollers 160. It has been found that when a tube is entirely threaded by a plug such as the plug 312, the oil which is used on the plug forms a vapor within the tube. To prevent this vapor from condensing, it is blown from the tube by air discharged through roller 368.

The tube is now moved on stationary rails 365 which form a part of the reversing mechanism C. This reversing mechanism is disclosed in my co-pending application, Serial #62,694, filed February 6, 1936. The reversing mechanism, shown in Fig. 4, may be briefly described as comprising the rails 365 which have notches forming seats for the glass tubes as moved longitudinally of the rails. At station IX a grooved support 366 is raised upwardly by a suitable cam 367 and is then turned through an angle of 180° by virtue of the cam actuated rack 368 which rotates a gear 369 keyed to the shaft which carries the grooved support 366. The rack may be actuated by a cam 370 on shaft 132, this cam actuated by a bell-crank lever 371 which is connected to the rack by a link 372.

Thus the tube is reversed end for end so that the opposite end of the tube may be acted upon by the flaring mechanism A' and the threading mechanism B' which are located on the same side of the machine as the mechanisms A and B, and are identical in construction with the mechanisms A and B. Thus the opposite end of the tube is flared and interiorly threaded and then finally discharged from the machine in a form shown in Figure 21. It will be understood that the tube threaded at each end in the manner shown in Figure 21 will be transferred to another machine where it will be divided into half-sections and bottom being formed on each half-section so that two vials are formed from each tube. Obviously, if desired, previously formed vials might be acted upon by the machine in which case only one flaring mechanism and one threading mechanism would be utilized, the vials being then discharged in complete form from the machine.

It might be noted that while the plug 312 rotates with the vial or tube being threaded, the plate 311 is fixed against rotation. Thus the end of the vial or tube being threaded rubs against the plate 311 so that a flat surface is formed and a roughening of the rim of the vial or tube is eliminated.

It should also be noted that the rollers 235 and 236 slightly overlap the plate 311 with the result that, should the rollers fail to tightly close on the threaded plug, there is no danger of the projecting edge being formed on the vial by a flaring of the end of the vial.

In Figures 22 and 23 there is disclosed a slightly modified means for driving a superposed roller which engages the glass tube during the threading operation. As in the first described form, there is mounted on the shaft 24ᵃ a gear 179ᵃ which, through an intermediate gear 178ᵃ, drives a gear 177ᵃ.

The roller 165ᵃ, instead of being connected by universal joints to the gear 177ᵃ, is directly secured to the shaft 375 to which the gear 177ᵃ is fixed. The roller 165ᵃ and its associated shaft 375 are adapted to be elevated by the rod 89ᵃ, the lower end of which engages the bar 102ᵃ which is moved vertically in the manner previously described with reference to bar 102.

The difference in the elevation of gear 177ᵃ with reference to gear 179ᵃ is taken care of by intermediate gear 178ᵃ which moves toward and away from gears 177ᵃ and 179ᵃ upon relative movements of the latter toward and away from each other. The desired movement of gear 178ᵃ is taken care of by links 376 and 377 which are pivotally secured to the axis of the gear 178ᵃ and to the axes of gears 177ᵃ and 179ᵃ. Thus the gear 178ᵃ remains in engagement with gears 177ᵃ and 179ᵃ regardless of the movement of the latter gears toward and away from each other. In Figures 24 and 25, a slightly modified form of means for unscrewing the vial or tube from the plug is illustrated. As in the first described form of construction, the blank 26ᵇ is supported for rotation on suitable rollers 25ᵇ. There is adapted to be inserted into the end of the tube a threaded plug 312ᵇ which rotates with the tube during the forming of the interior threads.

There is provided the usual superposed roller 165ᵇ which normally urges the tube 26ᵇ toward the left as viewed in Figure 24 of the drawings.

Instead of having a permanent back-stop and providing for disengagement from the tube by movement of the plug away from the tube, this modification contemplates providing the movable back-stop 380 which is controlled by a bell-crank lever 381 actuated by a suitable cam 382. The arrangement is such that after the inner threads have been formed, the back-stop is moved toward the left as viewed in Figure 24, thus permitting the vial or tube to be unscrewed from the threaded plug by virtue of the gentle pulling effected on the same by the roller 165. It will be understood that the threaded plug is held against rotation in a manner previously discussed.

The stop 380 can be moved such an amount that the glass is unscrewed from the plug and a fresh glass tube can be admitted between the stop and the threaded plug. Thus there need not be axial movement of the plug although if desired, there may be both axial movement of the plug and a like movement of the tube.

In Figure 26 there is disclosed a slight modification of the invention as illustrated, in which the tube 26ᶜ is held at its one end by a suitable chuck 385. This chuck is adapted to be rotated through suitable gears 386 and 387 and is adapted to be retracted or moved away from the threaded plug by means of a bell-crank lever 388 which engages a suitable collar 389 formed on the chuck and which is adapted to be actuated by a cam 390 and the bell-crank lever 391. Rollers 235ᶜ and 236ᶜ are arranged to engage the end of the tube being threaded while, of course, there is inserted into the end of the tube a threaded plug 312ᶜ. The plug, in this case, is fixed against longitudinal movement but this rotation is terminated by means of the pawl 392 actuated by a suitable link 393 from a cam 394.

The arrangement is such that when the plug is held against rotation, the chuck 385 is moved to the left as viewed in Figure 26, thus permitting the tube to be unscrewed from the plug.

In Figure 27 a still further modified form of the invention is illustrated in which the tube is held at its one end by the rotatively-mounted chuck 385ᵈ. The end of the tube to be threaded is arranged to be engaged by the rollers 236ᵈ and 235ᵈ, while there is adapted to be inserted in this end of the tube a threaded plug 312ᵈ. This plug is carried by a shaft 310ᵈ and may be rotatively driven by a gear 400 which engages a gear 401 loosely mounted on the shaft 402. A clutch member 403 fixed for rotation with the shaft 402 is adapted to engage a corresponding clutch member carried by a gear 401 to effect a rotation of the latter. Fixed to the chuck shaft is a gear 405 which engages the gear 406 also mounted for free rotation with shaft 402 but adapted to be coupled to this shaft by virtue of the clutch member 407. The clutch members 403 and 407 are adapted to be actuated by a link 408 which is controlled by the cam 409. Further, the shaft 310ᵈ is adapted to be drawn away from the tube 26ᵈ by a lever 411 actuated by a cam 412.

The arrangement is such that after the inner threads have been formed on the tube, the link 408 is shifted so that the rotation of chuck 385ᵈ is terminated and plug 312ᵈ is rotated to unthread the same from the tube. Then unthreading is aided by withdrawal of shaft 310ᵈ by virtue of lever 411.

In Figures 28 and 29, a still further modified form of the invention is shown in which provision is made whereby the movement of the rollers into and out of engagement with the tube being processed may be effected by manual means. As in the first described form of construction, the glass tube or vial 26ᵉ is suitably supported in any desired manner and is mounted for rotation. The rollers 235ᵉ and 236ᵉ are mounted on racks 225ᵉ and 226ᵉ so that they may be moved adjacent the tube being processed and may then be moved into engagement with the tube by spring means similar to that previously described.

The shaft 296ᵉ which carries the plug 312ᵉ, is journaled in a bearing 415 which is mounted for sliding movement toward and away from the tube 26ᵉ. The bearing is supported by virtue of the guide 416 which slides on an arm 417 which projects from the body of the machine.

For moving the bearing 415, the latter is provided with a lever 420 which has a yoke-shaped portion 421 which embraces the bearing. The lever 420 is also rockably mounted on the mounting 415 and is provided with elongated openings 422 which engage pins secured to the rack bars 225ᵉ and 226ᵉ. The pins are of sufficient length that the mounting 415 may be moved a substantial distance to the right as viewed in Figure 28 without the pin becoming disengaged from the lever 420.

Pivoted to the end of the guide 416 is a bell-crank lever 425 having portion 426 adapted to engage a ratchet wheel 427 secured to the end of the plug shaft 296ᵉ. The arrangement is such that when the plug is inserted in the vial, a set screw 430 carried by one end of the bell-crank lever 425 engages an abutment 431 on the end of bar 417 thus rocking the bell-crank and releasing the ratchet wheel 427 permitting the threaded plug to rotate with the vial. Obviously, when the mounting is moved toward the right to move the plug out of the vial, the bell crank 423 again engages ratchet wheel 427 and prevents rotation of the threaded plug.

In operation, the lever 420 may move first to the left as viewed in Figure 28, to insert the plug in an end of the vial. The lever 420 may then be rocked about its mounting 415 so as to bring the rollers 235ᵉ and 236ᵉ into engagement with the exterior of the tube. After the threading operation is completed, a releasing of the lever 420 will permit the spring 435 to again return the rollers to the racks 225ᵉ and 226ᵉ, to their initial positions.

While several embodiments of the invention have been described with some detail, it is to be clearly understood that the description is for the purpose of illustration only and is not definitive of the limits of the inventive idea. The right is reserved to make such changes in the details of construction and the steps of the method as will fall within the purview of the attached claims.

What I claim as my invention is:

1. In a machine of the class described, means for heating one end of a glass tube, cam actuated means for inserting a threaded plug into the heated end of the tube, a pair of rollers arranged to engage the exterior of the tube to force the heated glass into engagement with the threaded plug, and means, including a pair of rack bars, for moving said rollers into engagement with the glass tube.

2. In a machine of the class described, means for heating one end of a glass tube, cam actuated means for inserting a threaded plug into the heated end of the tube, a pair of rollers arranged to engage the exterior of the tube to force the heated glass into engagement with the threaded plug, and means for moving said rollers into engagement with the glass tube including a pair of vertically movable rack bars each of which carries one of said rollers, a gear disposed between said rack bars whereby movement of one rack bar in one direction imparts movement to the other rack bar in the other direction, and means for moving one of said rack bars.

3. In a machine of the class described, means for heating one end of a glass tube, cam actuated means for inserting a threaded plug into the heated end of the tube, a pair of rollers arranged to engage the tube to force the heated glass into engagement with the threaded plug, and means for moving said rollers into engagement with the glass tube including a pair of vertically movable rack bars, means pivotally mounting one roller on each of said rack bars, means urging said rollers about their pivots and in a direction toward each other, a gear disposed between said rack bars so arranged that movement of one rack bar in one direction imparts movement in the other direction to the other rack bar and means for moving one of said rack bars.

4. In a machine of the class described, a bed plate, a base plate mounted for adjustment transversely of the bed plate, said base plate being provided with an upstanding guide member, a block mounted on said upstanding guide member for adjustment vertically thereof, means providing a pair of ways in said block, rack bars disposed in said ways for longitudinal movement in the same, a threaded plug carried by said block and adapted to be inserted into the end of a glass tube, a roller carried by each of said rack bars and adapted to engage the exterior of the glass tube to force the glass into engagement with the threaded plug, and means for moving said rack bars to cause the same to move the rollers into engagement with the glass tube.

5. In a machine of the class described, means for supporting and rotating a glass tube, a threading tool, a carriage supporting said tool, means for moving said carriage and said tool axially with respect to said tube to position the tool in the end of the tube, and means providing limited lost motion axially of the tool between said tool and said carriage.

6. In a machine of the class described, means for supporting and rotating a glass tube, means for heating an end of said tube, a threading tool, a carriage supporting said tool rotatively therein, means on said carriage for moving said tool axially into and out of the heated end of the tube, means providing limited lost motion axially of the tool between said tool and said carriage, a pair of rollers supported on said carriage and movable oppositely towards each other to contract the heated end of the tube about said tool, and means for arresting rotation of said tool as it begins its movement out of the tube to unthread the tube from the tool.

7. In a machine of the class described, means for supporting and rotating a glass tube, means for heating an end of said tube, a threading tool, a carriage supporting said tool rotatively therein, means on said carriage for moving said tool axially into and out of the heated end of the tube, means providing limited lost motion axially of the tool between said tool and said carriage, a pair of rollers supported on said carriage and movable oppositely towards each other to contract the heated end of the tube about said tool, ratchet means associated with said tool, means movable into engagement with said ratchet means to prevent rotation of the tool, means for moving said ratchet engaging means out of engagement with said ratchet means when said tool is moved into the tube to permit rotation of the tool, and means for moving said ratchet engaging means into engagement with the ratchet means upon movement of the tool in a direction away from said tube.

JAKOB DICHTER.